(12) United States Patent
Vasseur et al.

(10) Patent No.: US 9,774,522 B2
(45) Date of Patent: Sep. 26, 2017

(54) TRIGGERING REROUTES USING EARLY LEARNING MACHINE-BASED PREDICTION OF FAILURES

(71) Applicant: Cisco Technology, Inc., San Jose, CA (US)

(72) Inventors: Jean-Philippe Vasseur, Saint Martin d'Uriage (FR); Grégory Mermoud, Veyras (CH); Sukrit Dasgupta, Norwood, MA (US)

(73) Assignee: Cisco Technology, Inc., San Jose, CA (US)

( * ) Notice: Subject to any disclaimer, the term of this patent is extended or adjusted under 35 U.S.C. 154(b) by 64 days.

(21) Appl. No.: 14/164,567

(22) Filed: Jan. 27, 2014

(65) Prior Publication Data

US 2015/0195192 A1 Jul. 9, 2015

Related U.S. Application Data

(60) Provisional application No. 61/923,910, filed on Jan. 6, 2014.

(51) Int. Cl.
  *H04L 1/00* (2006.01)
  *H04L 12/703* (2013.01)
  (Continued)

(52) U.S. Cl.
  CPC .......... *H04L 45/28* (2013.01); *G06F 11/2007* (2013.01); *G06N 7/005* (2013.01);
  (Continued)

(58) Field of Classification Search
  CPC ....... H04L 45/28; H04L 41/147; H04L 41/16; H04L 43/0817; H04L 45/02; H04L 45/70; H04W 40/18; H04W 40/30
  See application file for complete search history.

(56) References Cited

U.S. PATENT DOCUMENTS 6,577,597 B1 6/2003 Natarajan et al.
6,694,471 B1 2/2004 Sharp
(Continued)

FOREIGN PATENT DOCUMENTS

EP 1 473 890 A2 11/2004
EP 2 469 756 A1 6/2012

OTHER PUBLICATIONS

Fan, N., "Learning Nonlinear Distance Functions Using Neural Network for Regression with Application to Robust Human Age Estimation", IEEE International Conference on Computer Vision (ICCV), Nov. 2011, pp. 249-254, Institute of Electrical and Electronics Engineers, Barcelona, Spain.

(Continued)

*Primary Examiner* — Jutai Kao
(74) *Attorney, Agent, or Firm* — Parker Ibrahim & Berg LLC; James M. Behmke; Stephen D. LeBarron

(57) ABSTRACT

In one embodiment, network metrics are collected and analyzed in a network having nodes interconnected by communication links. Then, it is predicted whether a network element failure is relatively likely to occur based on the collected and analyzed network metrics. In response to predicting that a network element failure is relatively likely to occur, traffic in the network is rerouted in order to avoid the network element failure before it is likely to occur.

23 Claims, 7 Drawing Sheets

(51) Int. Cl.
| | |
|---|---|
| H04L 12/733 | (2013.01) |
| G06F 11/20 | (2006.01) |
| H04L 12/751 | (2013.01) |
| H04L 12/24 | (2006.01) |
| G06N 7/00 | (2006.01) |
| G06N 99/00 | (2010.01) |
| H04L 12/26 | (2006.01) |
| H04W 40/18 | (2009.01) |
| H04W 40/30 | (2009.01) |
| H04L 12/721 | (2013.01) |

(52) U.S. Cl.
CPC ....... *G06N 99/005* (2013.01); *H04L 41/0836* (2013.01); *H04L 41/147* (2013.01); *H04L 41/16* (2013.01); *H04L 45/02* (2013.01); *H04L 45/20* (2013.01); *H04L 43/0817* (2013.01); *H04L 43/0894* (2013.01); *H04L 45/70* (2013.01); *H04W 40/18* (2013.01); *H04W 40/30* (2013.01); *Y02B 60/50* (2013.01)

(56) References Cited

U.S. PATENT DOCUMENTS

| | | | |
|---|---|---|---|
| 6,769,024 | B1 | 7/2004 | Natarajan et al. |
| 6,785,239 | B1 | 8/2004 | Tasker |
| 6,886,040 | B1 | 4/2005 | Fitzgerald |
| 6,954,617 | B2* | 10/2005 | daCosta ................. 455/63.1 |
| 6,961,573 | B1 | 11/2005 | Moon et al. |
| 6,973,034 | B1 | 12/2005 | Natarajan et al. |
| 7,092,410 | B2 | 8/2006 | Bordonaro et al. |
| 7,457,877 | B1 | 11/2008 | Shah et al. |
| 7,568,045 | B1 | 7/2009 | Agrawal |
| 7,606,895 | B1 | 10/2009 | Dini et al. |
| 7,613,128 | B2 | 11/2009 | Castagnoli et al. |
| 7,680,047 | B2 | 3/2010 | Vadlakonda et al. |
| 7,724,676 | B2 | 5/2010 | Gerstel et al. |
| 7,948,910 | B2 | 5/2011 | Arbel et al. |
| 8,005,000 | B1 | 8/2011 | Srinivasan |
| 8,369,213 | B2 | 2/2013 | Vasseur et al. |
| 8,605,591 | B2 | 12/2013 | Shaffer et al. |
| 8,630,177 | B2 | 1/2014 | Vasseur et al. |
| 8,630,291 | B2 | 1/2014 | Shaffer et al. |
| 8,634,314 | B2 | 1/2014 | Banka et al. |
| 8,638,778 | B2 | 1/2014 | Lee et al. |
| 8,856,584 | B2* | 10/2014 | Matsubara ................. 714/4.2 |
| 2003/0005149 | A1* | 1/2003 | Haas ................. H04L 12/1854 709/238 |
| 2009/0019147 | A1 | 1/2009 | Ahlers et al. |
| 2011/0085461 | A1 | 4/2011 | Liu et al. |
| 2011/0267962 | A1* | 11/2011 | J S A et al. ................. 370/242 |
| 2012/0155475 | A1 | 6/2012 | Vasseur et al. |
| 2012/0233308 | A1 | 9/2012 | Van De Houten et al. |
| 2012/0307653 | A1 | 12/2012 | Vasseur et al. |
| 2013/0010610 | A1* | 1/2013 | Karthikeyan et al. ........ 370/242 |
| 2013/0022053 | A1 | 1/2013 | Vasseur et al. |
| 2013/0022083 | A1 | 1/2013 | Vasseur et al. |
| 2013/0024560 | A1 | 1/2013 | Vasseur et al. |
| 2013/0028103 | A1 | 1/2013 | Hui et al. |
| 2013/0121331 | A1 | 5/2013 | Vasseur et al. |
| 2013/0159479 | A1 | 6/2013 | Vasseur |
| 2013/0159486 | A1 | 6/2013 | Vasseur |
| 2013/0159550 | A1 | 6/2013 | Vasseur |
| 2013/0177305 | A1* | 7/2013 | Prakash ................. H04J 14/0269 398/5 |
| 2013/0201858 | A1 | 8/2013 | Varma et al. |
| 2013/0223229 | A1 | 8/2013 | Hui et al. |
| 2013/0250811 | A1 | 9/2013 | Vasseur et al. |
| 2013/0336126 | A1 | 12/2013 | Vasseur et al. |
| 2013/0336316 | A1 | 12/2013 | Sudhaakar et al. |
| 2014/0003277 | A1 | 1/2014 | Shim |
| 2014/0022928 | A1 | 1/2014 | Zingale et al. |
| 2014/0092753 | A1 | 4/2014 | Vasseur et al. |

OTHER PUBLICATIONS

Fortunato, S., "Community Detection in Graphs", arXiv:0906.0612v2.pdf [physics.soc-ph]; Physics Reports 486, 75-174, Jan. 2010, 103 pages.

Hui, et al., "An IPv6 Routing Header for Source Routes with the Routing Protocol for Low-Power and Lossy Networks (RPL)", Request for Comments 6554, Mar. 2012, 13 pages, Internet Engineering Task Force Trust.

Newman, et al., "Modularity and Community Structure in Networks", Proceedings of the National Academy of Sciences of the United States of America, Jun. 2006, vol. 103, No. 23, pp. 8577-8582, PNAS, Washington, DC.

Newman, M. E. J., "Analysis of Weighted Networks", http://arxiv.org/pdf/condmat/0407503.pdf, Phys. Rev. E 70, 056131, Jul. 2004, 9 pages.

Siddiky, et al., "An Efficient Approach to Rotation Invariant Face Detection Using PCA, Generalized Regression Neural Network and Mahalanobis Distance by Reducing Search Space", 10th International Conference on Computer and Information Technology, Dec. 2007, 6 pages, Dhaka, Bangladesh.

Ting, et al., "Variational Bayesian Least Squares: An Application to Brain-Machine Interface Data", Neural Networks, vol. 21, Issue 8, Oct. 2008, pp. 1112-1131, Elsevier.

Vasseur, et al., "Routing Metrics Used for Path Calculation in Low-Power and Lossy Networks", Request for Comments 6551, Mar. 2012, 30 pages, Internet Engineering Task Force Trust.

Vasseur, et al., "Learning-Machine-Based Predictive and Proactive Computer Networking and Associated Monitoring", U.S. Appl. No. 61/923,910, filed Jan. 6, 2014, 105 pages, U.S. Patent and Trademark Office, Alexandria, VA.

Winter, et al., "RPL: IPv6 Routing Protocol for Low-Power and Lossy Networks", Request for Comments 6550, Mar. 2012, 157 pages, Internet Engineering Task Force Trust.

International Search Report dated Apr. 24, 2015 issued in connection with PCT/US2015/010146.

Tao Liu et al.: "Data-driven link quality prediction using link features," ACM Transactions on Sensor Networks, vol. 10, No. 2, Jan. 1, 2014, pp. 1-35.

Nouha Baccour et al.: "Radio link quality estimation in wireless sensor networks," ACM Transactions on Sensor Networks, vol. 8, No. 4, Sep. 1, 2012, pp. 1-33.

Shio Kuman Singh et al.: "Routing Protocols in Wireless Sensor Networks—A Survey," International Journal of Computer Science & Engineering Survey, vol. 1, No. 2, Nov. 29, 2010, pp. 63-83.

Akkaya K. et al.: "A survey on routing protocols for wireless sensor networks," Ad Hoc Networks, Elsevier, Amsterdam, NL, vol. 3, No. 3, May 1, 2005, pp. 325-349.

* cited by examiner

A BAYESIAN NETWORK REPRESENTING THE JOINT PROBABILITY DISTRIBUTION OVER THREE RANDOM VARIABLES: X, Y, AND Z

TRIGGERING REROUTES USING EARLY LEARNING MACHINE-BASED PREDICTION OF FAILURES

RELATED APPLICATION

This application claims priority to U.S. Provisional Application No. 61/923,910, filed Jan. 6, 2014, entitled: LEARNING-MACHINE-BASED PREDICTIVE AND PROACTIVE COMPUTER NETWORKING AND ASSOCIATED MONITORING, by Vasseur, et al., the contents of which are herein incorporated by reference.

TECHNICAL FIELD

The present disclosure relates generally to computer networks, and, more particularly, to the use of learning machines within computer networks.

BACKGROUND

Low power and Lossy Networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. The challenging nature of these networks is exacerbated by the large number of nodes (an order of magnitude larger than a "classic" IP network), thus making the routing, Quality of Service (QoS), security, network management, and traffic engineering extremely challenging, to mention a few.

Machine learning (ML) is concerned with the design and the development of algorithms that take as input empirical data (such as network statistics and performance indicators), and recognize complex patterns in these data. In general, these patterns are then used to make decisions automatically (i.e., close-loop control) or to help make decisions. ML is a very broad discipline used to tackle very different problems (e.g., computer vision, robotics, data mining, search engines, etc.), but the most common tasks are the following: linear and non-linear regression, classification, clustering, dimensionality reduction, anomaly detection, optimization, association rule learning.

One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Learning Machines (LMs) are computational entities that rely one or more ML algorithm for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator.

Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, network metrics are collected and analyzed in a network having nodes interconnected by communication links. Then, it is predicted whether a network element failure is relatively likely to occur based on the collected and analyzed network metrics. In response to predicting that a network element failure is relatively likely to occur, traffic in the network is proactively rerouted in order to avoid the network element failure before it is likely to occur.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1:
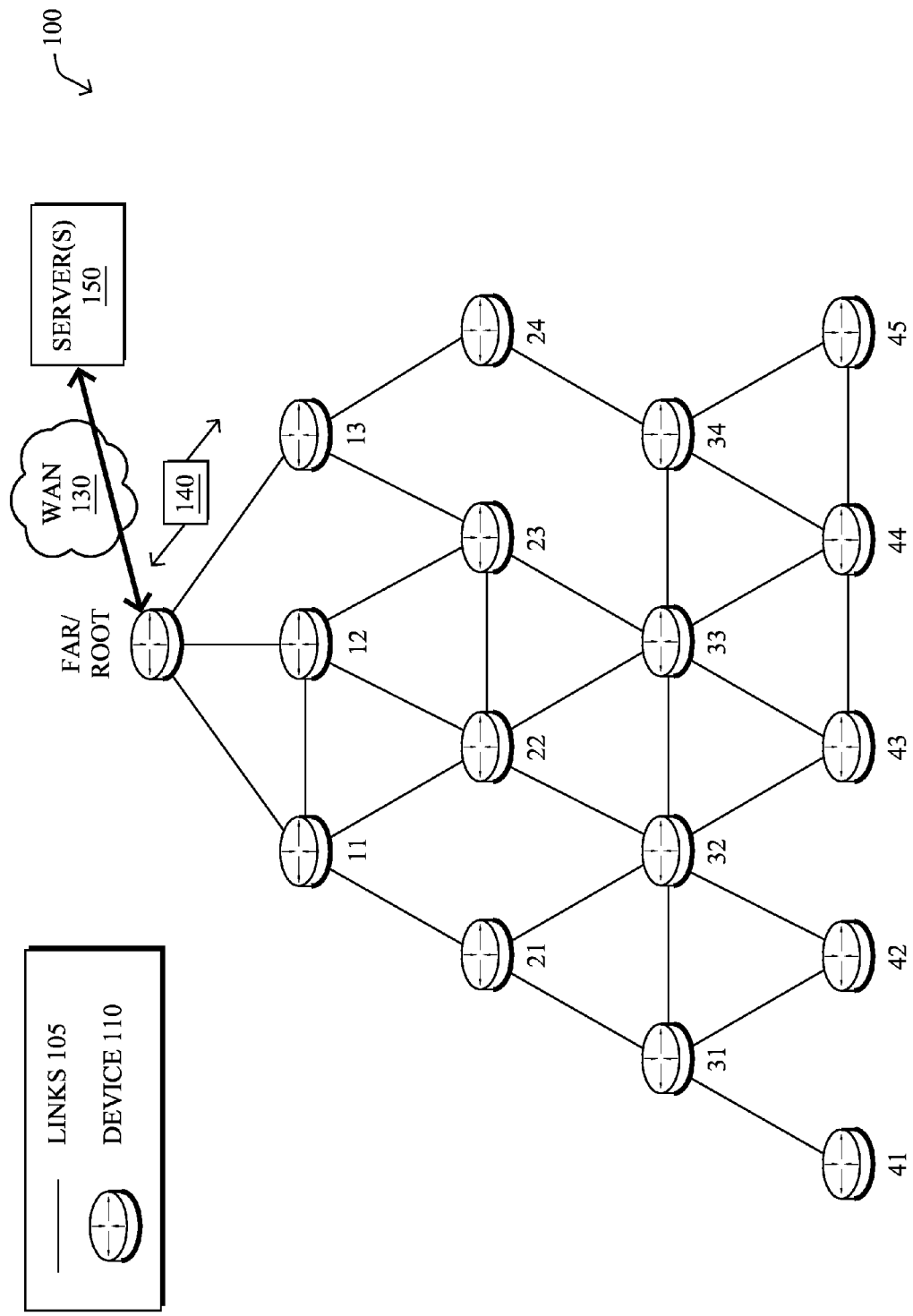
FIG. 1 illustrates an example communication network.

FIG. 1 is a schematic block diagram of an example computer network 100 illustratively comprising nodes/devices 110 (e.g., labeled as shown, "root," "11," "12," ... "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
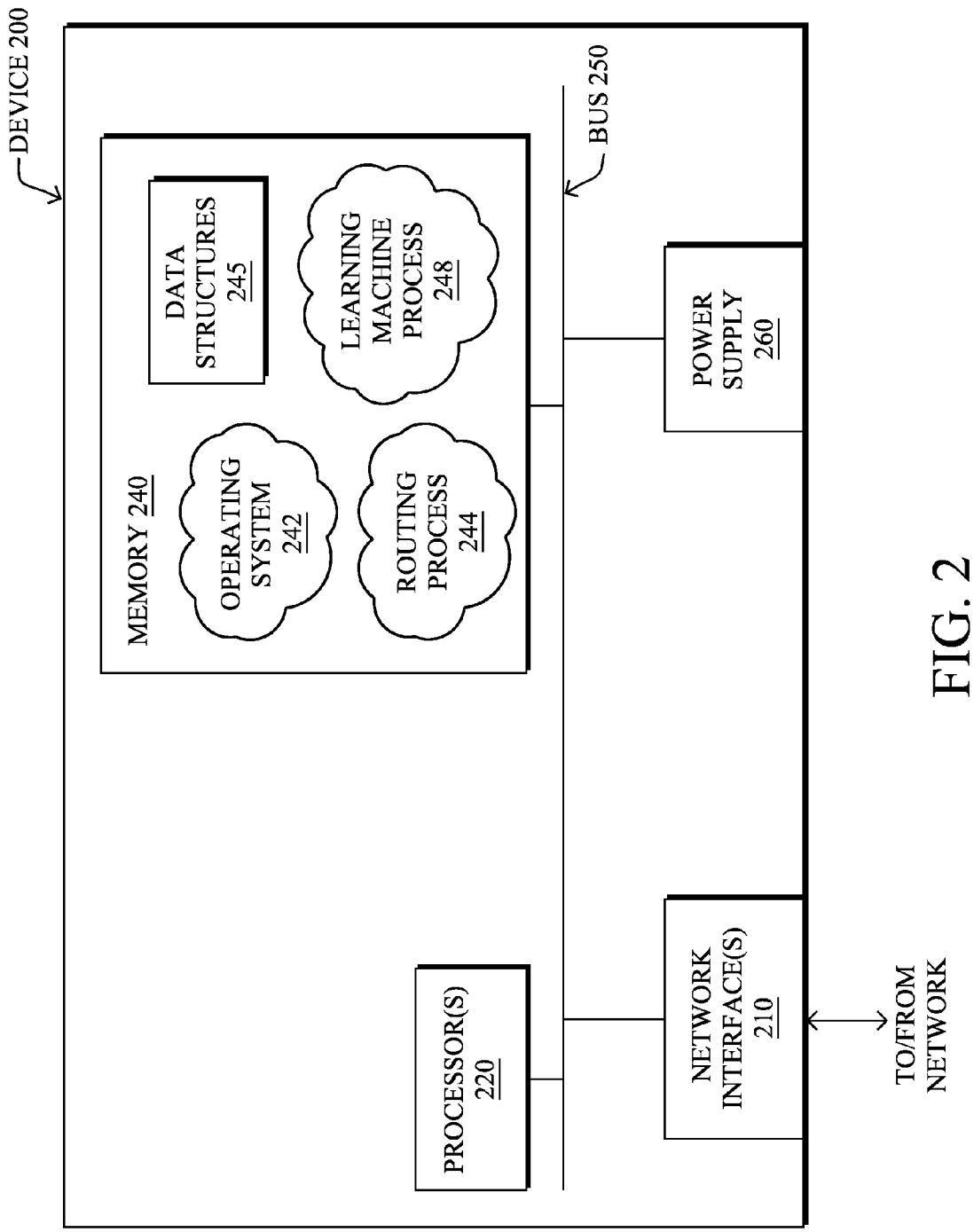
FIG. 2 illustrates an example network device/node.

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a routing process/services 244 and an illustrative "learning machine" process 248, which may be configured depending upon the particular node/device within the network 100 with functionality ranging from intelligent learning machine algorithms to merely communicating with intelligent learning machines, as described herein. Note also that while the learning machine process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" (or "Internet of Everything" or "IoE") may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs), FARs, or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

Figure 3:
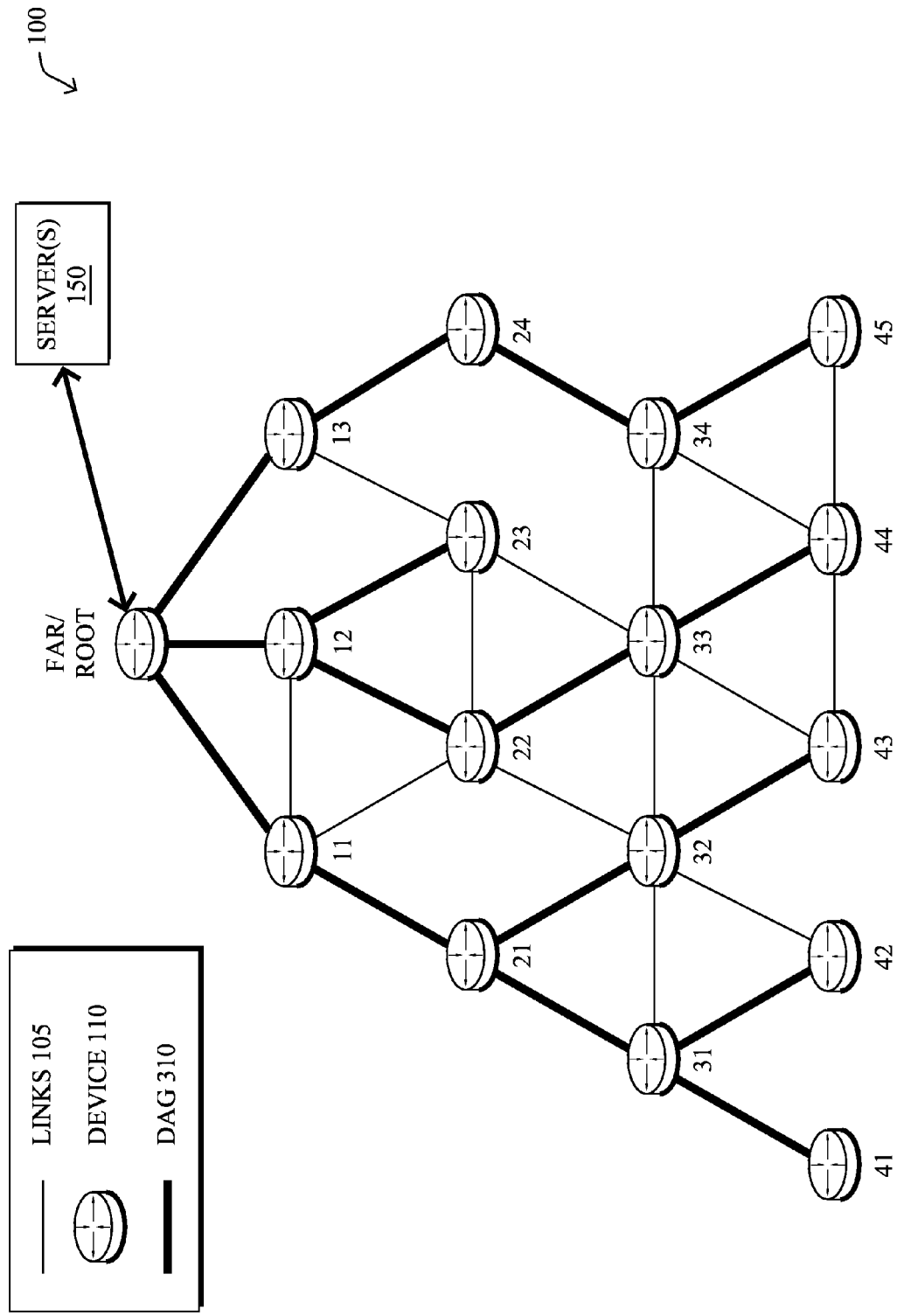
FIG. 3 illustrates an example directed acyclic graph (DAG) in the communication network of FIG. 1.

FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as bolded lines), which extends from the root node toward one or more leaf nodes (nodes without children). Traffic/packets 140 (shown in FIG. 1) may then traverse the DAG 310 in either the upward direction toward the root or downward toward the leaf nodes, particularly as described herein.

RPL supports two modes of operation for maintaining and using Downward routes:

1) Storing Mode: RPL routers unicast DAO messages directly to their DAG Parents. In turn, RPL routers maintain reachable IPv6 addresses for each of their DAG Children in their routing table. Because intermediate RPL routers store Downward routing state, this mode is called Storing mode.

2) Non-Storing Mode: RPL routers unicast DAO messages directly to the DAG Root. The DAO message also includes the IPv6 addresses for the source's DAG Parents. By receiving DAO messages from each RPL router in the network, the DAG Root obtains information about the DAG topology and can use source routing to deliver datagrams. Unlike Storing mode, intermediate RPL routers in Non-Storing mode do not maintain any Downward routes.

Learning Machine Technique(s)

As noted above, machine learning (ML) is concerned with the design and the development of algorithms that take as input empirical data (such as network statistics and performance indicators), and recognize complex patterns in these data. One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

As also noted above, learning machines (LMs) are computational entities that rely one or more ML algorithm for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator. Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

In particular, many LMs can be expressed in the form of a probabilistic graphical model also called Bayesian Network (BN). A BN is a graph G=(V,E) where V is the set of vertices and E is the set of edges. The vertices are random variables, e.g., X, Y, and Z (see FIG. 4) whose joint distribution P(X,Y,Z) is given by a product of conditional probabilities:

$$P(X,Y,Z)=P(Z|X,Y)P(Y|X)P(X) \quad (Eq. 1)$$

Figure 4:
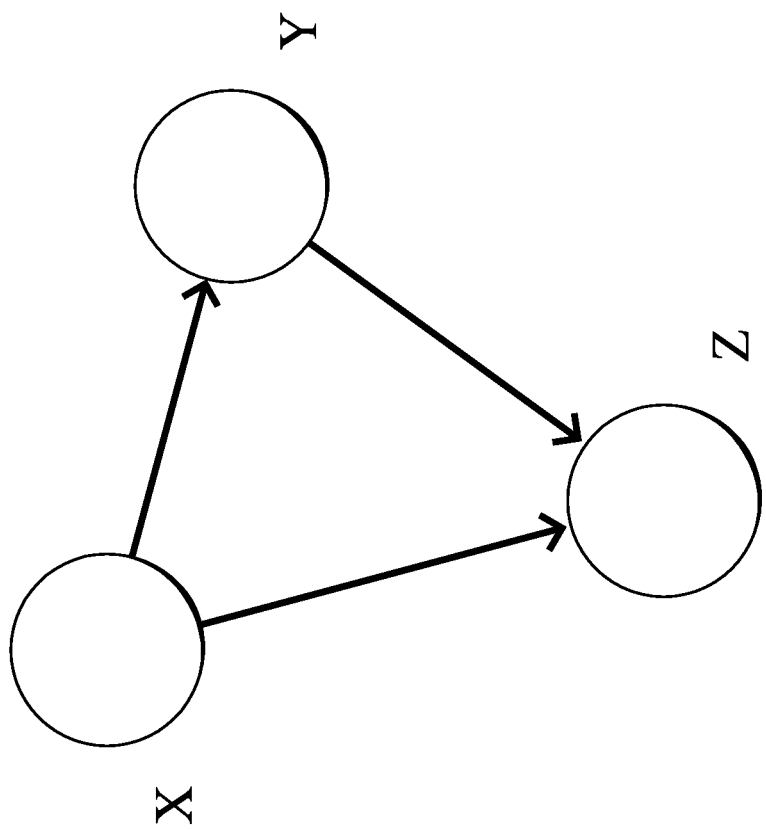
FIG. 4 illustrates an example Bayesian network.

The conditional probabilities in Eq. 1 are given by the edges of the graph in FIG. 4. In the context of LMs, BNs are used to construct the model M as well as its parameters.

To estimate the relationship between network properties of a node I (or link), noted $x_i$, (e.g., hop count, rank, firmware version, etc.) and a given networking metric $M_i$, a linear regression may be performed. More specifically, given the following equation:

$$M_i=F(x_i)=b^T x_i+\epsilon \quad (Eq. 2)$$

where $x_i$ is a d-dimensional vector of observed data (e.g., end-node properties such as the rank, the hop count, the distance to the FAR, etc.) and $M_i$ is the target metric (e.g., the time to join the network), which is also noted $y_i$ sometimes. Building such a model of a performance metric knowing a set of observed features is critical to perform root cause analysis, network monitoring, and configuration: for example the path delay as a function of the node rank, link quality, etc., can then be used to determine whether anomalies appear in the network and thus take some appropriate actions to fix the issue. In the equation (Eq. 2) above, the term $\epsilon$ is a Gaussian random variable used to model the uncertainty and/or the noise on the estimate $M_i$. The linear regression consists in finding the weight vector b that fulfills the maximum likelihood criterion (which coincides with the least square criterion when $\epsilon$ is Gaussian). In particular, the optimal b must minimize the Mean Squared Error (MSE):

$$MSE=\Sigma_i(b^T x_i-y_i)^2/N \quad (Eq. 3)$$

where N is the total number of input data points, i.e., i=1, . . . , N.

In other words, b is a set of weights for each observed value $x_i$, used to compute the function F that provides the value of F. The MSE is a metric used to compute the "quality" of the model function F.

The usual approach to the solving of Eq. (2) is the ordinary least square (OLS) equation, which involves a "d×d" matrix inversion, where d is the number of dimensions. Three main problems arise immediately: (i) the dimensionality of $x_i$ may be large, thus making OLS prohibitively expensive in terms of computational cost (approximately $O(d^3)$), (ii) in presence of co-linearity (i.e., when several node properties are strongly correlated, as it is the case for the hop count and the ETX, for instance), OLS becomes numerically unstable (i.e., round-off and truncation errors are magnified, causing the MSE to grow exponentially), (iii) OLS being essentially non-probabilistic (i.e., it doesn't account for the whole distribution of its constituent variables, but it merely tracks averages), it cannot cope well with noise and outliers, and it is simply not applicable when $\epsilon$ is not Gaussian.

Figure 5:
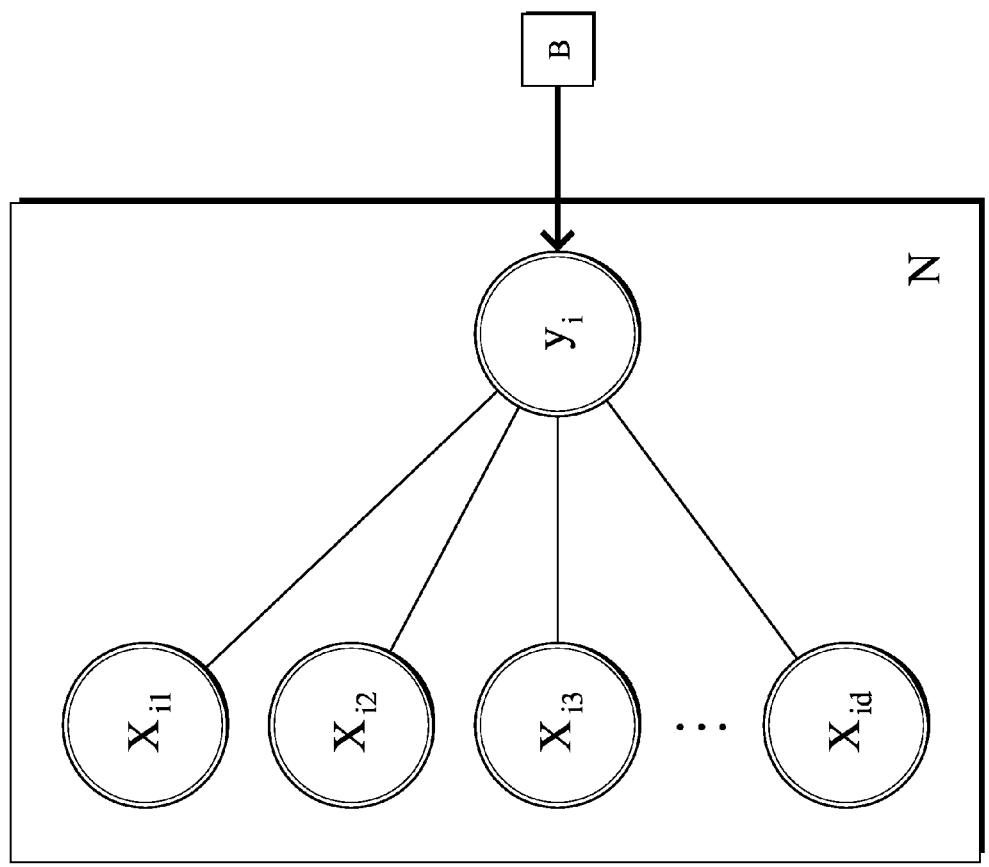
FIG. 5 illustrates an example Bayesian network for linear regression.

To overcome these limitations, the problem can be formulated as a BN (see FIG. 5). Now, all variables are considered as random variables, even though they are all observed at this point: both input variable $x_i$ and the output variable $y_i$ are experimental data, and b is a (non-probabilistic) parameter of the BN at this point. By pushing this approach a little bit further, one may turn b into a random variable as well, and attempt to infer it from experimental data (that is, the observations of $x_i$ and $y_i$). However, this inference problem is non-trivial, especially as one desirable feature of this learning algorithm is that it is capable of identifying non-relevant dimensionalities of x (that is, input dimensions that are weakly correlated with the output x), and automatically set the corresponding weights in b to a zero (or a very small) value.

This problem is solved by one recently proposed algorithm called Variational Bayes Least Square (VBLS) regression (Ting, D'Souza, Vijayakumar, & Schaal, 2010). Namely, this algorithm allows for efficient learning and feature selection in high-dimensional regression problems, while avoiding the use of expensive and numerically brittle matrix inversion. VBLS adds a series of non-observed random variables $z_{ij}$ that can be considered as noisy, fake targets of the factor $b_j \cdot x_{ij}$, and whose sum $\Sigma_j z_{ij}$ is an estimate of $y_i$. In turn, the weights $b_j$ are modeled as random variables, thereby allowing for automated feature detection, i.e., the mean of $b_j$ converges rapidly to zero if no correlation exists between the various $x_{ij}$ and $y_i$.

VBLS estimates the distribution of the non-observed variables $z_i$ and b using a variant of the Expectation Maximization algorithm with a variational approximation for the posterior distributions, which are not analytically tractable. Because it is a fully Bayesian approach, VBLS does not require any parameterization, except for the initial (prior) distributions of hidden parameters, which are set in an uninformative way, i.e., with very large variances that lead to flat distributions.

Triggering Reroutes Using Early LM-Based Prediction of Failures

Handling network failures is undoubtedly a critical network functionality and a number of technologies related to traffic reroute upon network element failure have been proposed. All of these techniques are reactive, that is, alternate paths (which may be pre-computed or calculated on-the-fly) are used upon detecting a failure. In the case of low-speed networks such as LLNs, the issue is exacerbated by the fact that the control plane must be extremely lightweight, under-reactive (since link/node do fail very often) in contrast with classic IP/MPLS network, and failures are extremely hard to detect (a number of strategies have been proposed in order to avoid the use of costly Keep-alive mechanisms).

Consequently, in contrast with existing approach, the techniques herein rely on the use of a predictive approach using a learning machine (LM) using time-series analysis to predict the failure of network elements, such that traffic can be rerouted prior to even detecting the failure.

Said differently, in contrast with all-known approaches for network recovery, the techniques herein provide for a reroute that takes place proactively (before detecting a failure) thanks to the computation of a predictive model by a Learning Machine hosted on a router or network controller. Once the set of (local) proactive reroute triggers have been computed by the LM, each node in the network will pre-compute alternate paths taking into account the class of service, path cost stretch of alternate paths, and the probability of failures. Following this, traffic will be proactively and locally rerouted as soon as the conditions of the triggers computed by the LM are met, thus dramatically improving resiliency in LLNs where reactive and data driven reroutes are known as being highly inefficient. Optionally, keep-alive messages are used during the predicted period of time to capture the occurrence of the suspected failure and send a feedback to the LM with data used to refine the predictive model, making this approach adaptive. The last component lies in the ability to rely of collective reroute notification in a specific area to avoid a set of network element suspected to fail.

In classic IP/MPLS networks making use of an optical layer-1 infrastructure or SONET/SDH, failures are highly predictable, which is due to the more deterministic nature of these networks. The notion of failure fate sharing does exist with Shared Risk Link Group (SRLG), where the probability of failure Pij of a link Li knowing that another link Lj has failure can be computed and in practice is set to 1. More advanced studies have shown that one may compute these inter-dependencies with values of P<1, in order to compute alternate (backup) paths that avoid network elements. That being said, all recovery mechanisms are still reactive using fast keep-alive (routing, or protocols such as BFD); unfortunately such an approach is ill-suited for LLNs; furthermore due to the number of features that can be observed and because these network are highly stochastic, the techniques herein specify an approach whereby a Learning Machine (LM) is used to build a predictive model used to trigger proactive reroute according to an estimated probability of failure.

Operationally, a time series can be represented as a sequence of values x1, x2, x3, . . . , xk. Note that these values are vectors here, as they represent multiple network properties (or features) that are being used by the LM for predicting the probability of failure. Alternatively, one may represent a time series as a function of time x(t) that yields the sequence x1, x2, x3, . . . , xk when sampled at times t=1, t=2, t=3, . . . , t=k. Now, given this sequence of so-called feature vectors basically represent the state of a network element at a given time t, and a sequence of such states may, in principle, contain clues of a potential future failure. As an example, the fact that both the ETX and the RSSI of a link suddenly drop (say that it drops by 25% in less than 5 seconds) might be indicative of a failure with probability 95%.

The way an LM may predict network element failures is by analyzing historical data.

The first component of the techniques herein consists for the Learning Machine (LM) in computing a set of parameters:

1) T is a set of features that have been selected/computed by the LM as relevant indicators of a probability of failure. For instance, T may be {RSSI, ETX}, which would be used by the node to compute a feature vector xT=[−94, 1.4].

2) Cond(xT) is a conditional statement that depends on xT, which, if true, indicates an imminent failure with probability P and an (optional) estimated duration D.

Since LLNs may exhibit a wide range of behaviors according to the node type, location, link-layer type, etc., the value of Cond, T, P, and D may be node, area, or network wide. To that end, the techniques herein specify a newly defined IPv6 message sent by the LM, which may either be located on the NMS, Field Area Router (FAR), or a network controller, to either a set of nodes using a unicast messages or a multicast message (that may be broadcasted if multicast is not supported by the link layer). The message called PF( ) (Predictive Failure) comprises the following components:

The set of features T;
The conditional statement Cond;
The probability P; and
(Optionally) The estimated duration D.

Figure 6:
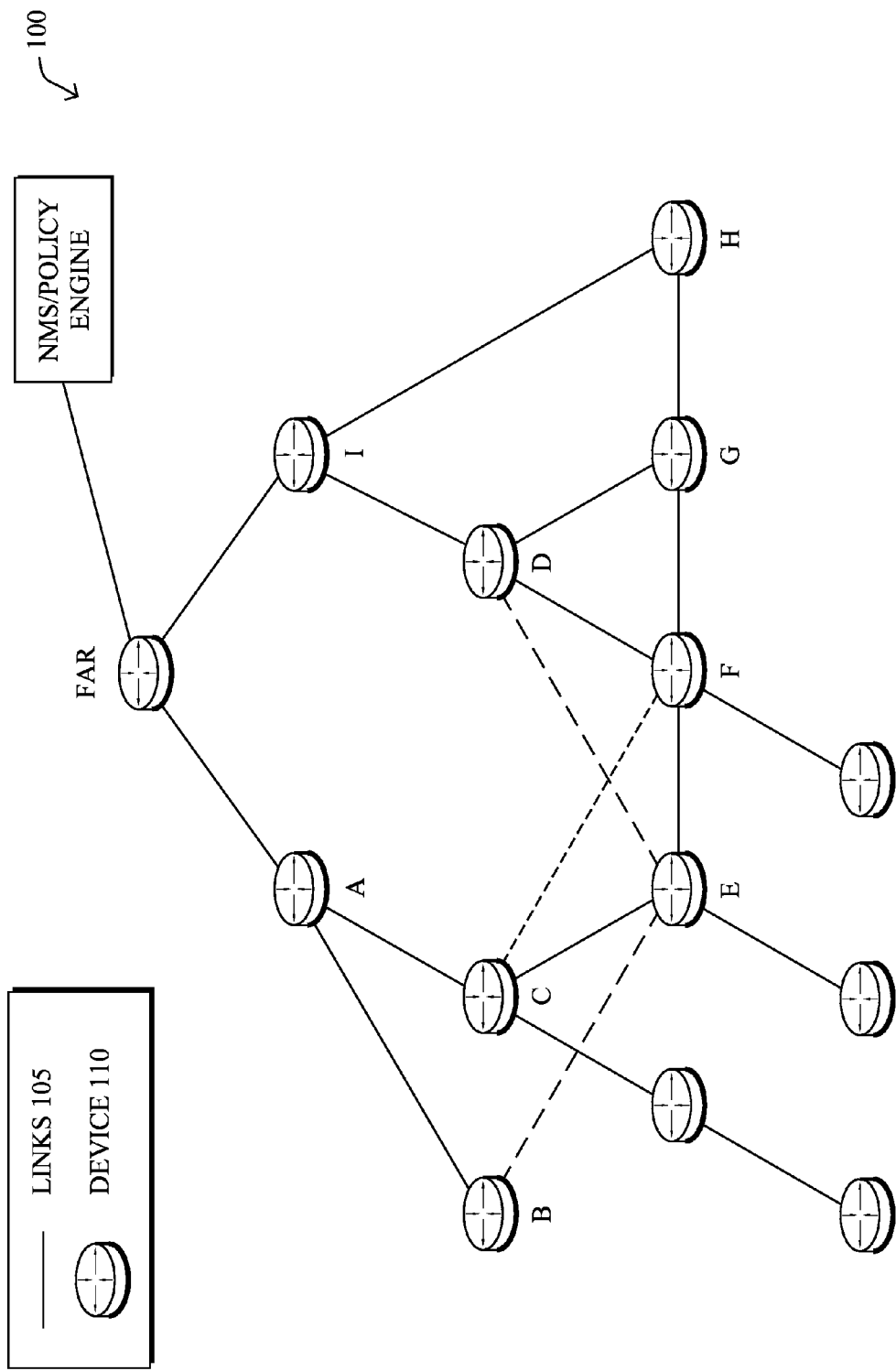
FIG. 6 illustrates an example of an approach to trigger reroute using early LM-based prediction of failures.

For the sake of illustration, referring to FIG. 6, the FAR hosting the LM may multicast a message PF( ) to all-nodes in the network with the following rule: if RSSI<R_min, ETX>E_Max, P=0.8, D=15 mn. Note that the features of interest used as a predictive trigger may be locally computed. Note that stochastic networks are in part characterized by temporary phenomena that may not be captured by metrics used by a routing protocol or provided to a NMS, considering the volatility of such attributes. For example, upon capturing that a short brutal variation of the RSSI (the second derivative of the RSSI( ) crossed some thresholds), the LM may request nodes to locally captures some of these highly variable features and monitor them in order to be used as triggers indicative of the network element failure. Note that the use of local variable specified by a network element such as a LM is a key feature herein. Back to the example above, the node E may start monitoring two variables RSSI and ETX (which belong to the vector T).

Upon receiving a message PF( ), each node in the network will trigger the following set of actions:

1) Activate the monitoring of the features listed in the vector T. In one embodiment, if the node is already monitoring some features, it will continue to do so, else if different features are being monitored, then monitoring is stopped for those features and started for the new ones.

2) In one embodiment, the node may rely on restoration, in which case the node may make use of the newly defined triggers to reroute traffic along an alternate path computed when the trigger returns a positive value (reroute traffic), relying on the routing protocol. In another embodiment, the node will make use of a protection mechanism whereby alternate paths (backup) are computed a priori. In this case, each node will pre-compute an acceptable alternate path avoiding the network element that is likely to fail with a probability P. Note that alternate paths may vary with the CoS of the potentially impacted traffic taking into account the path cost stretch and the probability of failure. For the sake of illustration, consider the node E, routing/originating traffic of class of service C1, C2 and C3; two variables are used as triggers that have been provided by the LM, called V1 and V2, indicative of a probability of failure P of the next hop E2 if V1 and/or V2 crossed some thresholds. The node may compute alternate paths avoiding E2, then determining that two paths exists: B1 (with a path cost stretch PCS(B1) and PCS(B1)). In one embodiment, the node may use the probability P in order to decide whether to activate the reroute of traffic. In another embodiment, the node may determine which alternate path should be used for each traffic according to the SLA for the related CoS, and the path cost stretch (PCS).

3) According to local policy (pre-configured on the node or received upon registration thanks to a newly defined network management message, or DHCP), the node may simply decide to ignore the message. This can also happen should the resources on the node be insufficient or should the node not require any predictive rerouting of traffic (for example, if the node is a leaf node, routing/originating non critical traffic).

EXAMPLES

Traffic of class C1 will not be rerouted since P is too low, or the PCS are too high considering P.
Traffic of class C2 will be rerouted using B1 (E-D-A) considering PCS(B1).
Traffic of class C3 will be rerouted using B2 (E-B-A) considering PCS(B2).

Proactive reroute: This is the process by which traffic is routed around a potential failed element before the actual failure takes place. Proactive reroute may make use of different mechanisms. Once the node determines that traffic of class Ci must be rerouted onto an alternate path Pi, it may in one embodiment redirect the traffic to an alternate parent (node D for B1), or the node may alternatively explicitly source route the IP packet using for example a source route header as specified in RFC6554.

If D>0 (D is specified by the LM), then the node E uses a revertive reroute approach; after the expiration of D, traffic is reverted back to its original path, at which point, the node actively monitors the packet success rate R for D+Delta seconds. Optionally, the node may then send a signal back to the LM, thanks to a newly defined unicast IPv6 message called PFF (Predictive Failure Feed-back) indicating the packet delivery rate R after the expiration of the period of time D. The LM uses this in order to refine its predictive model and also potentially tune the duration D.

Temporary neighbor keep-alive: optionally, once proactive rerouting has been activated, the node may start low keep-alive with its next hop for a period of time T2 and computes the packet delivery rate for the probes sent during the period D. Such a value is used in order to confirm that the prediction was correct, and is then returned thanks to the newly defined message PFF( ) specified above.

Another (optional) component of the techniques herein lies in the use of link-local triggers shared between a set of nodes in the vicinity. If a set of nodes in an area have received a similar message PF( ), they may share a signal using a newly defined PR( ) (Proactive Reroute) when triggering the reroute in order for each node to appropriately reroute traffic on selected alternate path. For example, if the node E determines that traffic must be rerouted (a features Ti has crossed a threshold), it may send a link-local IPv6 message PR( ) to all nodes in the neighborhood. Upon receiving PR( ) messages nodes may then determine the most appropriate alternate paths and avoid an entire area as opposed to a next hop. Back to the example, if both E and F sends a PR( ) message comprising the links suspected of upcoming failure, then E may proactively reroute traffic to a totally different path (E-F-G-H-I) in order to avoid the whole list of network elements suspected of failures.

Figure 7:
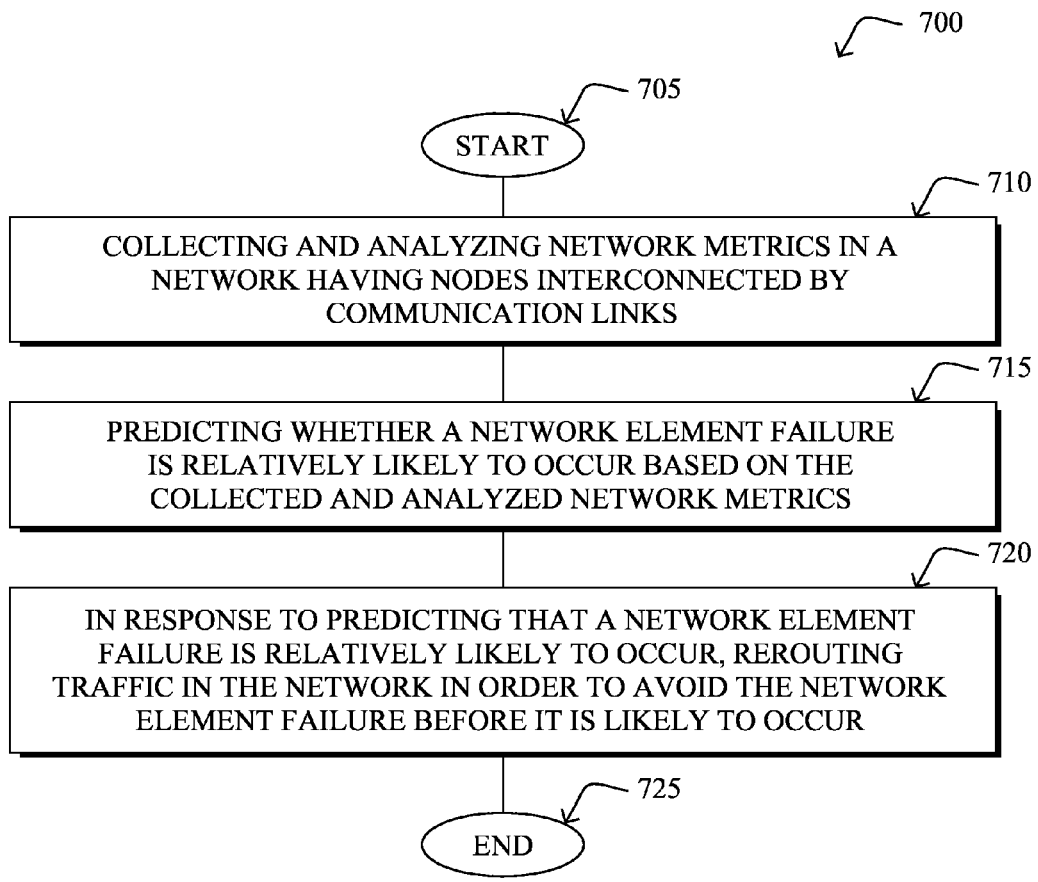
FIG. 7 illustrates an example simplified procedure for triggering reroutes using early learning machine-based prediction of failures.

FIG. 7 illustrates an example simplified procedure for triggering reroutes using early learning machine-based prediction of failures. The procedure 700 may start at step 705, continue to step 710, and so forth.

At step 710, network metrics are collected and analyzed in a network having nodes interconnected by communication links. Then, at step 715, it is predicted whether a network element failure is relatively likely to occur based on the collected and analyzed network metrics. At step 720, in response to predicting that a network element failure is relatively likely to occur, traffic in the network is rerouted in order to avoid the network element failure before it is likely to occur. The procedure 700 may illustratively end at step 725. The techniques by which the steps of procedure 700 may be performed, as well as ancillary procedures and parameters, are described in detail above.

It should be noted that the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for an approach to trigger reroute using early LM-based prediction of failures. In particular, the techniques herein:

1. Proactively reroute traffic in LLN environments where QoS (thus resilience to failures that are far from being rare) is critical.

2. Prevent overloading the control plane (routing protocol) as there is no signaling involved in reaction to failures detected.

3. Significantly improve the resiliency in constrained networks as traffic continues to flow around failed elements while the failure event is taking place.

4. Share the efficacy of the prediction with the LM computational entity to keep improving future predictions and proactive triggers.

5. Ensure through revertive behavior that proactive changes are not permanent and the LM entity has a chance to improve upon future decisions.

Note that the techniques herein are similarly applicable to reactive routing protocol such as Load-ng or other routing protocols specified in the future for the IoT.

Illustratively, each of the techniques described herein may be performed by hardware, software, and/or firmware, such as in accordance with the learning machine process 248, which may contain computer executable instructions executed by the processor 220 (or independent processor of interfaces 210) to perform functions relating to the techniques described herein, e.g., optionally in conjunction with other processes. For example, certain aspects of the techniques herein may be treated as extensions to conventional protocols, such as the various communication protocols (e.g., routing process 244), and as such, may be processed by similar components understood in the art that execute those protocols, accordingly. Also, while certain aspects of the techniques herein may be described from the perspective of a single node/device, embodiments described herein may be performed as distributed intelligence, also referred to as edge/distributed computing, such as hosting intelligence within nodes 110 of a Field Area Network in addition to or as an alternative to hosting intelligence within servers 150.

While there have been shown and described illustrative embodiments that provide for learning-machine-based predictive and proactive computer networking and associated monitoring, generally, it is to be understood that various other adaptations and modifications may be made within the spirit and scope of the embodiments herein. For example, the embodiments have been shown and described herein with relation to LLNs and related protocols. However, the embodiments in their broader sense are not as limited, and may, in fact, be used with other types of communication networks and/or protocols. In addition, while the embodiments have been shown and described with relation to learning machines in the specific context of communication networks, certain techniques and/or certain aspects of the techniques may apply to learning machines in general without the need for relation to communication networks, as will be understood by those skilled in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    collecting and analyzing, by a machine learning device executing a machine learning time series analysis, network metrics in a network having nodes interconnected by communication links;
    predicting, by the machine learning time series analysis on the machine learning device, whether a network element failure of any one of the other nodes in the network is likely to occur based on the collected and analyzed network metrics;
    generating and sending, by the machine learning device, an instruction to any one of the other nodes in the network to pre-compute alternate communication routes local to each respective node, wherein the instructions instruct the one or more nodes to pre-compute alternate communication routes local to each respective node taking into account at least a class of service, a path cost stretch of alternate paths, and probability of failures; and
    in response to predicting that a network element failure of any one of the other nodes in the network is likely to occur, proactively rerouting, by the machine learning device, traffic in the network in order to avoid the network element failure before the failure is likely to occur.

2. The method as in claim 1, further comprising:
    receiving information regarding an alternate communication route of a node in the network; and
    rerouting the traffic in the network based on the alternate communication route of the node.

3. The method as in claim 1, wherein the rerouting of traffic is based on one or more of a type of traffic, a path cost of an alternate communication route, and a probability of network element failure.

4. The method as in claim 1, further comprising:
    calculating a probability of network element failure; and
    predicting that the network element failure is likely to occur when the calculated probability exceeds a predetermined threshold.

5. The method as in claim 1, wherein the network element failure involves one or more of a failed node and a failed communication link.

6. The method as in claim 1, further comprising:
    determining a routing topology of the network; and
    rerouting the traffic in the network based on the determined routing topology.

7. The method as in claim 1, further comprising:
    constructing a predictive model based on the collected and analyzed network metrics and results of past predictions, wherein
    the predicting of whether the network element failure is likely to occur is based further on the predictive model.

8. The method as in claim 7, further comprising:
    receiving feedback regarding an accuracy of the predictive model; and
    refining the predictive model based on the received feedback, wherein
    the feedback involves whether the predicted network element failure actually occurred or information in response to a probe sent to nodes in the network upon expiration of a predetermined duration.

9. The method as in claim 1, wherein the collected and analyzed network metrics are network element failure indicators.

10. The method as in claim 1, wherein the collected and analyzed network metrics include one or more of battery life, a weather condition, traffic volume, communication link quality, signal strength, a location of a node or communication link, a distance of a communication link, and a transmission success rate.

11. The method as in claim 1, wherein the predicting of whether the network element failure is likely to occur is performed by a learning machine (LM).

12. An apparatus, comprising:
    one or more network interfaces that communicate with a network;
    a processor coupled to the one or more network interfaces and configured to execute a process; and
    a memory configured to store program instructions which contain the process executable by the processor, the process comprising:
        collecting and analyzing network metrics in the network having nodes interconnected by communication links;
        predicting, by a machine learning time series analysis, whether a network element failure of any one of the other nodes in the network is likely to occur based on the collected and analyzed network metrics;
        generating and sending an instruction to any one of the other nodes in the network to compute alternate communication routes local to each respective node, wherein the instructions instruct the one or more nodes to pre-compute alternate communication routes local to each respective node taking into account at least a class of service, a path cost stretch of alternate paths, and probability of failures; and
        in response to predicting that a network element failure of any one of the other nodes in the network is likely to occur, proactively rerouting traffic in the network in order to avoid the network element failure before the failure is likely to occur.

13. The apparatus as in claim 12, wherein the process further comprises:
    receiving information regarding an alternate communication route of a node in the network; and
    rerouting the traffic in the network based on the alternate communication route of the node.

14. The apparatus as in claim 12, wherein the rerouting of traffic is based on one or more of a type of traffic, a path cost of an alternate communication route, and a probability of network element failure.

15. The apparatus as in claim 12, wherein the process further comprises:

calculating a probability of network element failure; and predicting that the network element failure is likely to occur when the calculated probability exceeds a predetermined threshold.

16. The apparatus as in claim 12, wherein the network element failure involves one or more of a failed node and a failed communication link.

17. The apparatus as in claim 12, wherein the process further comprises:

determining a routing topology of the network; and rerouting the traffic in the network based on the determined routing topology.

18. The apparatus as in claim 12, wherein the process further comprises:

constructing a predictive model based on the collected and analyzed network metrics and results of past predictions, wherein the predicting of whether the network element failure is likely to occur is based further on the predictive model.

19. The apparatus as in claim 18, wherein the process further comprises:

receiving feedback regarding an accuracy of the predictive model; and refining the predictive model based on the received feedback, wherein the feedback involves whether the predicted network element failure actually occurred or information in response to a probe sent to nodes in the network upon expiration of a predetermined duration.

20. The apparatus as in claim 12, wherein the collected and analyzed network metrics are network element failure indicators.

21. The apparatus as in claim 12, wherein the collected and analyzed network metrics include one or more of battery life, a weather condition, traffic volume, communication link quality, signal strength, a location of a node or communication link, a distance of a communication link, and a transmission success rate.

22. The apparatus as in claim 12, wherein the apparatus is a learning machine (LM).

23. A tangible non-transitory computer readable medium storing program instructions that cause a computer to execute a process, the process comprising:

collecting and analyzing network metrics in a network having nodes interconnected by communication links;

predicting, by a machine learning time series analysis, whether a network element failure of any one of the other nodes in the network is likely to occur based on the collected and analyzed network metrics;

generating and sending an instruction to any one of the other nodes in the network to pre-compute alternate communication routes local to each respective node, wherein the instructions instruct the one or more nodes to pre-compute alternate communication routes local to each respective node taking into account at least a class of service, a path cost stretch of alternate paths, and probability of failures; and in response to predicting that a network element failure of any one of the other nodes in the network is likely to occur, proactively rerouting traffic in the network in order to avoid the network element failure before the failure is likely to occur.

* * * * *